(12) United States Patent
Abdallah

(10) Patent No.: US 10,228,949 B2
(45) Date of Patent: Mar. 12, 2019

(54) SINGLE CYCLE MULTI-BRANCH PREDICTION INCLUDING SHADOW CACHE FOR EARLY FAR BRANCH PREDICTION

(75) Inventor: Mohammad Abdallah, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 527 days.

(21) Appl. No.: 13/824,013

(22) PCT Filed: Sep. 16, 2011

(86) PCT No.: PCT/US2011/051992
§ 371 (c)(1),
(2), (4) Date: Jul. 11, 2016

(87) PCT Pub. No.: WO2012/037491
PCT Pub. Date: Mar. 22, 2012

(65) Prior Publication Data
US 2017/0262287 A1    Sep. 14, 2017

Related U.S. Application Data

(60) Provisional application No. 61/384,198, filed on Sep. 17, 2010.

(51) Int. Cl.
G06F 9/38      (2018.01)
G06F 9/30      (2018.01)
G06F 12/0875   (2016.01)

(52) U.S. Cl.
CPC ........ G06F 9/3806 (2013.01); G06F 9/30018 (2013.01); G06F 9/30029 (2013.01);
(Continued)

(58) Field of Classification Search
None
See application file for complete search history.

(56) References Cited

U.S. PATENT DOCUMENTS 727,487 A    5/1903   Swan
4,075,704 A  2/1978   O'Leary
(Continued)

FOREIGN PATENT DOCUMENTS

CN    1214666 A    4/1999
CN    1305150 A    7/2001
(Continued)

OTHER PUBLICATIONS

Final Office Action from U.S. Appl. No. 14/212,533, dated Jan. 4, 2017, 27 pages.
(Continued)

*Primary Examiner* — Eric Coleman
(74) *Attorney, Agent, or Firm* — Nicholson De Vos Webster & Elliiott LLP

(57) ABSTRACT

A method of identifying instructions including accessing a plurality of instructions that comprise multiple branch instructions. For each branch instruction of the multiple branch instructions, a respective first mask is generated representing instructions that are executed if a branch is taken. A respective second mask is generated representing instructions that are executed if the branch is not taken. A prediction output is received that comprises a respective branch prediction for each branch instruction. For each branch instruction, the prediction output is used to select a respective resultant mask from among the respective first and second masks. For each branch instruction, a resultant mask of a subsequent branch is invalidated if a previous branch is predicted to branch over said subsequent branch. A logical operation is performed on all resultant masks to (Continued)

produce a final mask. The final mask is used to select a subset of instructions for execution.

24 Claims, 6 Drawing Sheets

(52) U.S. Cl.
CPC ........ *G06F 9/30047* (2013.01); *G06F 9/3804* (2013.01); *G06F 9/3836* (2013.01); *G06F 9/3844* (2013.01); *G06F 9/3869* (2013.01); *G06F 12/0875* (2013.01); *G06F 2212/1016* (2013.01); *G06F 2212/452* (2013.01)

(56) References Cited

U.S. PATENT DOCUMENTS

| | | |
|---|---|---|
| 4,245,344 A | 1/1981 | Richter |
| 4,356,550 A | 10/1982 | Katzman et al. |
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A | 5/1990 | Yokota |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,590,084 A | 12/1996 | Miyano et al. |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,978,906 A * | 11/1999 | Tran ................. G06F 9/3806 |
| | | 712/239 |
| 5,983,327 A | 11/1999 | Achilles et al. |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,085,315 A * | 7/2000 | Fleck ................. G06F 9/325 |
| | | 712/241 |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 | 1/2001 | Sollars |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | Greg |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 | 10/2002 | Arimilli et al. |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |
| 6,557,083 B1 | 4/2003 | Sperber et al. |
| 6,557,095 B1 | 4/2003 | Henstrom |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 | 4/2004 | Le et al. |
| 6,728,866 B1 | 4/2004 | Kahle et al. |
| 6,775,761 B2 | 8/2004 | Wang et al. |
| 6,829,698 B2 | 12/2004 | Arimilli et al. |
| 6,850,531 B1 | 2/2005 | Rao et al. |
| 6,882,177 B1 | 4/2005 | Reddy et al. |
| 6,907,600 B2 | 6/2005 | Neiger et al. |

(56) References Cited

U.S. PATENT DOCUMENTS

| | | | |
|---|---|---|---|
| 6,912,644 B1 | 6/2005 | O'Connor et al. | |
| 6,920,530 B2 | 7/2005 | Musumeci | |
| 6,944,744 B2 | 9/2005 | Ahmed et al. | |
| 6,948,172 B1 | 9/2005 | D'Souza | |
| 6,950,927 B1 | 9/2005 | Apisdorf et al. | |
| 6,954,846 B2 | 10/2005 | Leibholz et al. | |
| 6,985,591 B2 | 1/2006 | Graunke | |
| 6,988,183 B1 | 1/2006 | Wong | |
| 7,007,108 B2 | 2/2006 | Emerson et al. | |
| 7,020,879 B1 | 3/2006 | Nemirovsky et al. | |
| 7,047,322 B1 | 5/2006 | Bauman et al. | |
| 7,111,145 B1 | 9/2006 | Chen et al. | |
| 7,117,347 B2 | 10/2006 | Col et al. | |
| 7,139,855 B2 | 11/2006 | Armstrong et al. | |
| 7,143,273 B2 | 11/2006 | Miller et al. | |
| 7,149,872 B2 | 12/2006 | Rozas et al. | |
| 7,150,021 B1 | 12/2006 | Vajjhala et al. | |
| 7,171,535 B2 | 1/2007 | Naoi | |
| 7,203,824 B2* | 4/2007 | Bean | G06F 9/30149 712/204 |
| 7,206,925 B1 | 4/2007 | Jacobson et al. | |
| 7,213,106 B1 | 5/2007 | Koster et al. | |
| 7,213,248 B2 | 5/2007 | Arimilli et al. | |
| 7,231,106 B2 | 6/2007 | Basavanhally et al. | |
| 7,257,695 B2 | 8/2007 | Jiang et al. | |
| 7,278,030 B1 | 10/2007 | Chen et al. | |
| 7,284,092 B2 | 10/2007 | Nunamaker et al. | |
| 7,290,261 B2 | 10/2007 | Burky et al. | |
| 7,313,775 B2 | 12/2007 | Casey et al. | |
| 7,343,476 B2 | 3/2008 | Floyd et al. | |
| 7,373,637 B2 | 5/2008 | Dewitt et al. | |
| 7,380,096 B1 | 5/2008 | Rozas et al. | |
| 7,383,427 B2 | 6/2008 | Yamazaki | |
| 7,398,347 B1 | 7/2008 | Pechanek et al. | |
| 7,406,581 B2 | 7/2008 | Southwell et al. | |
| 7,418,579 B2 | 8/2008 | Guibert et al. | |
| 7,418,582 B1 | 8/2008 | Iacobovici et al. | |
| 7,441,110 B1* | 10/2008 | Puzak | G06F 8/4442 712/207 |
| 7,493,475 B2 | 2/2009 | Colavin | |
| 7,539,879 B2 | 5/2009 | Terechko et al. | |
| 7,546,420 B1 | 6/2009 | Shar et al. | |
| 7,577,820 B1 | 8/2009 | Wentzlaff et al. | |
| 7,613,131 B2 | 11/2009 | Decasper et al. | |
| 7,617,384 B1* | 11/2009 | Coon | G06F 9/3851 712/220 |
| 7,634,637 B1 | 12/2009 | Lindholm et al. | |
| 7,647,483 B2 | 1/2010 | Bates et al. | |
| 7,680,988 B1 | 3/2010 | Nickolls et al. | |
| 7,681,019 B1 | 3/2010 | Favor | |
| 7,707,397 B2* | 4/2010 | Henry | G06F 9/30058 711/171 |
| 7,707,578 B1 | 4/2010 | Zedlewski et al. | |
| 7,711,929 B2 | 5/2010 | Burky et al. | |
| 7,716,460 B2 | 5/2010 | Stempel et al. | |
| 7,757,065 B1 | 7/2010 | Jourdan et al. | |
| 7,770,161 B2 | 8/2010 | Mitran et al. | |
| 7,783,868 B2 | 8/2010 | Ukai | |
| 7,783,869 B2 | 8/2010 | Grandou et al. | |
| 7,809,925 B2 | 10/2010 | Mejdrich et al. | |
| 7,848,129 B1 | 12/2010 | Deshpande et al. | |
| 7,856,530 B1 | 12/2010 | Mu | |
| 7,861,060 B1 | 12/2010 | Nickolls et al. | |
| 7,877,582 B2 | 1/2011 | Gschwind et al. | |
| 7,913,058 B2 | 3/2011 | Rozas et al. | |
| 7,925,869 B2 | 4/2011 | Kelsey et al. | |
| 8,044,951 B1 | 10/2011 | Brown et al. | |
| 8,046,775 B2 | 10/2011 | Kang et al. | |
| 8,082,420 B2 | 12/2011 | Comparan et al. | |
| 8,108,545 B2 | 1/2012 | Arimilli et al. | |
| 8,145,844 B2 | 3/2012 | Bruce | |
| 8,145,880 B1 | 3/2012 | Cismas et al. | |
| 8,145,882 B1 | 3/2012 | Kishore et al. | |
| 8,200,949 B1 | 6/2012 | Tarjan et al. | |
| 8,219,996 B1 | 7/2012 | Morris | |
| 8,230,423 B2 | 7/2012 | Frigo et al. | |
| 8,239,656 B2 | 8/2012 | Rozas et al. | |
| 8,301,847 B2 | 10/2012 | Dantzig et al. | |
| 8,316,435 B1 | 11/2012 | Varadhan et al. | |
| 8,327,115 B2 | 12/2012 | Abdallah | |
| 8,438,366 B2 | 5/2013 | Akizuki et al. | |
| 8,522,253 B1 | 8/2013 | Rozas et al. | |
| 8,539,486 B2 | 9/2013 | Cain, III et al. | |
| 8,645,965 B2 | 2/2014 | Zimmer et al. | |
| 8,756,329 B2 | 6/2014 | Reynolds et al. | |
| 8,868,838 B1 | 10/2014 | Glasco et al. | |
| 8,930,674 B2 | 1/2015 | Avudaiyappan et al. | |
| 9,047,178 B2 | 6/2015 | Talagala et al. | |
| 9,135,003 B2 | 9/2015 | Suh et al. | |
| 9,811,377 B2 | 11/2017 | Abdallah et al. | |
| 9,823,930 B2 | 11/2017 | Abdallah et al. | |
| 2001/0016901 A1 | 8/2001 | Topham | |
| 2001/0032303 A1 | 10/2001 | Pechanek et al. | |
| 2001/0049782 A1 | 12/2001 | Hsu et al. | |
| 2002/0029308 A1 | 3/2002 | Babaian et al. | |
| 2002/0062435 A1 | 5/2002 | Nemirovsky et al. | |
| 2002/0069326 A1 | 6/2002 | Richardson et al. | |
| 2002/0082824 A1 | 6/2002 | Neiger et al. | |
| 2002/0083312 A1* | 6/2002 | Sinharoy | G06F 9/30047 712/240 |
| 2002/0099913 A1 | 7/2002 | Steely et al. | |
| 2002/0126657 A1 | 9/2002 | Frouin et al. | |
| 2002/0129085 A1 | 9/2002 | Kubala et al. | |
| 2002/0174321 A1 | 11/2002 | John et al. | |
| 2002/0188833 A1 | 12/2002 | Henry et al. | |
| 2003/0035422 A1 | 2/2003 | Hill | |
| 2003/0065887 A1 | 4/2003 | Maiyuran et al. | |
| 2003/0088752 A1 | 5/2003 | Harman | |
| 2003/0093776 A1 | 5/2003 | Hilton | |
| 2003/0101322 A1 | 5/2003 | Gardner | |
| 2003/0101444 A1 | 5/2003 | Wu et al. | |
| 2003/0126408 A1 | 7/2003 | Vajapeyam et al. | |
| 2003/0131335 A1 | 7/2003 | Hamlin | |
| 2003/0149862 A1 | 8/2003 | Kadambi | |
| 2003/0163642 A1 | 8/2003 | Borkenhagen et al. | |
| 2003/0169626 A1 | 9/2003 | Burk et al. | |
| 2003/0200396 A1 | 10/2003 | Musumeci | |
| 2003/0200412 A1 | 10/2003 | Peinado et al. | |
| 2003/0202530 A1 | 10/2003 | Jenkins et al. | |
| 2003/0225938 A1 | 12/2003 | Glasco et al. | |
| 2003/0226001 A1 | 12/2003 | Moyer et al. | |
| 2003/0233394 A1 | 12/2003 | Rudd et al. | |
| 2004/0034762 A1 | 2/2004 | Kacevas | |
| 2004/0044850 A1 | 3/2004 | George et al. | |
| 2004/0064668 A1 | 4/2004 | Kjos et al. | |
| 2004/0073909 A1 | 4/2004 | Arimilli et al. | |
| 2004/0078538 A1 | 4/2004 | Dutt et al. | |
| 2004/0093483 A1 | 5/2004 | Nguyen et al. | |
| 2004/0098567 A1 | 5/2004 | Hansen et al. | |
| 2004/0103251 A1 | 5/2004 | Alsup | |
| 2004/0117593 A1 | 6/2004 | Uhlig et al. | |
| 2004/0117594 A1 | 6/2004 | Vanderspek | |
| 2004/0122887 A1 | 6/2004 | Macy | |
| 2004/0138857 A1 | 7/2004 | Souza et al. | |
| 2004/0139441 A1 | 7/2004 | Kaburaki et al. | |
| 2004/0143727 A1 | 7/2004 | McDonald | |
| 2004/0158822 A1 | 8/2004 | Sandham et al. | |
| 2004/0172523 A1 | 9/2004 | Merchant et al. | |
| 2004/0187123 A1 | 9/2004 | Tremblay et al. | |
| 2004/0193857 A1 | 9/2004 | Miller et al. | |
| 2004/0202158 A1 | 10/2004 | Takeno et al. | |
| 2004/0205296 A1 | 10/2004 | Bearden | |
| 2004/0215886 A1 | 10/2004 | Cargnoni et al. | |
| 2004/0216105 A1 | 10/2004 | Burky et al. | |
| 2004/0216120 A1 | 10/2004 | Burky et al. | |
| 2004/0225872 A1 | 11/2004 | Bonanno et al. | |
| 2005/0005085 A1 | 1/2005 | Miyanaga | |
| 2005/0027961 A1 | 2/2005 | Zhang | |
| 2005/0044547 A1 | 2/2005 | Gipp | |
| 2005/0055504 A1 | 3/2005 | Hass et al. | |
| 2005/0060457 A1 | 3/2005 | Olukotun | |
| 2005/0066131 A1 | 3/2005 | Biles et al. | |
| 2005/0108480 A1 | 5/2005 | Correale, Jr. et al. | |
| 2005/0108715 A1 | 5/2005 | Kanai et al. | |

(56) References Cited

U.S. PATENT DOCUMENTS

| | | |
|---|---|---|
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter et al. |
| 2005/0154867 A1 | 7/2005 | Dewitt et al. |
| 2005/0204118 A1 | 9/2005 | Jen et al. |
| 2005/0216920 A1 | 9/2005 | Tewari et al. |
| 2005/0251639 A1 | 11/2005 | Vishin et al. |
| 2005/0251649 A1 | 11/2005 | Yamazaki |
| 2005/0262270 A1 | 11/2005 | Latorre et al. |
| 2005/0289299 A1 | 12/2005 | Nunamaker et al. |
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 | 2/2006 | Glebe |
| 2006/0080380 A1 | 4/2006 | Aizu et al. |
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 | 7/2006 | Kissell |
| 2006/0161921 A1 | 7/2006 | Kissell |
| 2006/0179257 A1 | 8/2006 | Chu et al. |
| 2006/0179281 A1 | 8/2006 | Jensen et al. |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |
| 2006/0236080 A1* | 10/2006 | Doing .................. G06F 9/3804 712/238 |
| 2006/0242365 A1 | 10/2006 | Ali et al. |
| 2006/0242384 A1 | 10/2006 | Ahmed et al. |
| 2006/0256641 A1 | 11/2006 | Johnstone |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0198665 A1 | 8/2007 | De Matteis et al. |
| 2007/0214343 A1 | 9/2007 | Lindholm et al. |
| 2007/0226722 A1* | 9/2007 | Chou ..................... G06F 8/443 717/158 |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine et al. |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1 | 5/2008 | Higuchi |
| 2008/0126771 A1 | 5/2008 | Chen et al. |
| 2008/0148237 A1 | 6/2008 | Jiang et al. |
| 2008/0184211 A1 | 7/2008 | Nickolls et al. |
| 2008/0195844 A1 | 8/2008 | Shen et al. |
| 2008/0215865 A1 | 9/2008 | Hino et al. |
| 2008/0225987 A1 | 9/2008 | Fazzi et al. |
| 2008/0235500 A1 | 9/2008 | Davis et al. |
| 2008/0250227 A1 | 10/2008 | Linderman et al. |
| 2008/0250232 A1* | 10/2008 | Nakashima ........... G06F 9/3808 712/225 |
| 2008/0256278 A1 | 10/2008 | Thomas et al. |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0070554 A1 | 3/2009 | Wang et al. |
| 2009/0113170 A1 | 4/2009 | Abdallah |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1 | 6/2009 | Mejdrich et al. |
| 2009/0150890 A1 | 6/2009 | Yourst |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0240919 A1 | 9/2009 | Alexander et al. |
| 2009/0241084 A1* | 9/2009 | Malley .................. G06F 17/505 716/104 |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0313462 A1* | 12/2009 | Emma ................... G06F 9/3005 712/240 |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1 | 4/2010 | Riocreux et al. |
| 2010/0100690 A1 | 4/2010 | Rajamani et al. |
| 2010/0100704 A1 | 4/2010 | Hill et al. |
| 2010/0100707 A1 | 4/2010 | Mejdrich et al. |
| 2010/0115167 A1 | 5/2010 | Tardieux et al. |
| 2010/0115244 A1 | 5/2010 | Jensen et al. |
| 2010/0138607 A1 | 6/2010 | Hughes et al. |
| 2010/0154042 A1 | 6/2010 | Miyamoto et al. |
| 2010/0161948 A1 | 6/2010 | Abdallah |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2010/0332805 A1 | 12/2010 | Blasco et al. |
| 2011/0010521 A1 | 1/2011 | Wang et al. |
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1 | 5/2011 | Tanaka |
| 2011/0153955 A1 | 6/2011 | Herrenschmidt et al. |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1 | 2/2012 | Maeda et al. |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1 | 4/2012 | Auerbach et al. |
| 2012/0198209 A1 | 8/2012 | Abdallah et al. |
| 2012/0246450 A1 | 9/2012 | Abdallah |
| 2012/0246657 A1 | 9/2012 | Abdallah |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan |
| 2013/0283286 A1 | 10/2013 | Lee et al. |
| 2013/0304991 A1 | 11/2013 | Boettcher et al. |
| 2013/0311759 A1 | 11/2013 | Abdallah |
| 2013/0339671 A1 | 12/2013 | Williams, III et al. |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan |
| 2014/0075168 A1 | 3/2014 | Abdallah |
| 2014/0108730 A1 | 4/2014 | Avudaiyappan et al. |

(56) References Cited

U.S. PATENT DOCUMENTS

| | | |
|---|---|---|
| 2014/0123145 A1 | 5/2014 | Barrow-Williams et al. |
| 2014/0156947 A1 | 6/2014 | Avudaiyappan |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah |
| 2014/0281416 A1 | 9/2014 | Abdallah |
| 2014/0281426 A1 | 9/2014 | Abdallah et al. |
| 2014/0281427 A1 | 9/2014 | Abdallah |
| 2014/0281428 A1 | 9/2014 | Abdallah et al. |
| 2014/0281436 A1 | 9/2014 | Abdallah |
| 2014/0282592 A1 | 9/2014 | Abdallah |
| 2014/0282601 A1 | 9/2014 | Abdallah |
| 2014/0317387 A1 | 10/2014 | Abdallah |
| 2014/0344554 A1 | 11/2014 | Abdallah |
| 2014/0373022 A1 | 12/2014 | Chan |
| 2015/0039859 A1 | 2/2015 | Abdallah |
| 2015/0046683 A1 | 2/2015 | Abdallah |
| 2015/0046686 A1 | 2/2015 | Abdallah |
| 2015/0186144 A1 | 7/2015 | Abdallah |
| 2016/0041908 A1 | 2/2016 | Avudaiyappan |
| 2016/0041913 A1 | 2/2016 | Avudaiyappan |
| 2016/0041930 A1 | 2/2016 | Avudaiyappan |
| 2016/0154653 A1 | 6/2016 | Abdallah |
| 2016/0210145 A1 | 7/2016 | Abdallah |
| 2016/0210176 A1 | 7/2016 | Abdallah |
| 2016/0371188 A1 | 12/2016 | Abdallah et al. |

FOREIGN PATENT DOCUMENTS

| | | |
|---|---|---|
| CN | 1451115 A | 10/2003 |
| CN | 1214666 C | 8/2005 |
| CN | 1713137 A | 12/2005 |
| CN | 1774709 A | 5/2006 |
| CN | 1841314 A | 10/2006 |
| CN | 1841332 A | 10/2006 |
| CN | 1848095 A | 10/2006 |
| CN | 1881223 A | 12/2006 |
| CN | 101114218 A | 1/2008 |
| CN | 101151594 A | 3/2008 |
| CN | 101241428 A | 8/2008 |
| CN | 101344840 A | 1/2009 |
| CN | 101449256 A | 6/2009 |
| CN | 101582025 A | 11/2009 |
| CN | 101627365 A | 1/2010 |
| CN | 101916180 A | 12/2010 |
| CN | 102105864 A | 6/2011 |
| EP | 0596636 A2 | 5/1994 |
| EP | 0706133 A2 | 4/1996 |
| EP | 2616928 A2 | 7/2013 |
| GB | 2343270 A | 5/2000 |
| JP | 2000330790 A | 11/2000 |
| KR | 20010050794 A | 6/2001 |
| KR | 20010053622 | 6/2001 |
| KR | 20100003309 A | 1/2010 |
| TW | 200707284 | 3/1995 |
| TW | 539996 B | 7/2003 |
| TW | 544626 B | 8/2003 |
| TW | 200401187 A | 1/2004 |
| TW | 200405201 A | 4/2004 |
| TW | 591530 B | 6/2004 |
| TW | 200422949 A | 11/2004 |
| TW | I233545 B | 6/2005 |
| TW | I281121 B | 5/2007 |
| TW | 200813766 A | 3/2008 |
| TW | 200844853 A | 11/2008 |
| TW | 200941339 A | 10/2009 |
| TW | I315488 B | 10/2009 |
| TW | 200949690 A | 12/2009 |
| TW | I329437 B | 8/2010 |
| TW | I331282 B | 10/2010 |
| TW | I352288 B | 11/2011 |
| TW | 201227520 A | 7/2012 |
| TW | 201241744 A | 10/2012 |
| TW | 201305819 A | 2/2013 |
| WO | 9750031 A1 | 12/1997 |
| WO | 9919793 A1 | 4/1999 |
| WO | 0125921 A1 | 4/2001 |
| WO | 2004114128 A2 | 12/2004 |
| WO | 2007027671 A2 | 3/2007 |
| WO | 2008021434 A1 | 2/2008 |
| WO | 2008061154 A2 | 5/2008 |
| WO | 2009012296 A2 | 1/2009 |
| WO | 2009101563 A1 | 8/2009 |
| WO | 2010049585 A1 | 5/2010 |
| WO | 2012135031 A2 | 10/2012 |
| WO | 2012135050 A2 | 10/2012 |

OTHER PUBLICATIONS

Final Office Action from U.S. Appl. No. 14/213,115, dated Feb. 3, 2015, 11 pages.

Final Office Action from U.S. Appl. No. 14/213,115, dated Mar. 7, 2016, 18 pages.

Final Office Action from U.S. Appl. No. 14/213,692, dated Jan. 20, 2016, 18 pages.

Final Office Action from U.S. Appl. No. 14/213,854, dated Nov. 9, 2015, 19 pages.

Final Office Action from U.S. Appl. No. 14/214,045, dated Aug. 29, 2016, 14 pages.

Final Office Action from U.S. Appl. No. 14/214,280, dated Mar. 6, 2017, 12 pages.

Final Office Action from U.S. Appl. No. 14/214,280, dated Mar. 11, 2016, 18 pages.

Final Office Action from U.S. Appl. No. 14/214,280, dated Oct. 24, 2016, 20 pages.

Final Office Action from U.S. Appl. No. 14/360,284, dated Mar. 1, 2017, 10 pages.

First Office Action from foreign counterpart China Patent Application No. CN201280034725, dated Oct. 26, 2015, 26 pages.

First Office Action from foreign counterpart China Patent Application No. CN201280034739, dated Nov. 3, 2015, 39 pages.

First Office Action from foreign counterpart China Patent Application No. CN201310589048, dated Feb. 2, 2016, 8 pages.

First Office Action from foreign counterpart Chinese Patent Application No. 201280024054.0, dated May 30, 2016, 24 pages.

First Office Action from foreign counterpart Chinese patent application No. 201280024095, dated May 26, 2016, 32 pages.

Franklin et al., "The Expandable Split Window Paradigm for Exploiting Fine-Grain Parallelism," ACM Sigarch Computer Architecture News, ACM Special Interest Group on Computer Architecture, vol. 20 (2), 1992, 10 pages.

Grant of Patent for Korean Application No. 10-2015-7028745, dated Nov. 30, 2016, 2 pages.

Intention to Grant a patent for European Application No. 07811845, dated Mar. 31, 2016, 58 pages.

Intention to Grant a patent for European Application No. 12150513, dated Mar. 15, 2016, 59 pages.

International Preliminary Report on Patentability and for Application No. PCT/US2007/084710, dated May 19, 2009, 4 pages.

International Preliminary Report on Patentability and Written Opinion for Application No. PCT/US2007/066536, dated Oct. 14, 2008, 6 pages.

International Preliminary Report on Patentability and Written Opinion for Application No. PCT/US2012/038711, dated Nov. 20, 2013, 5 pages.

International Preliminary Report on Patentability and Written Opinion for Application No. PCT/US2012/038713, dated Nov. 20, 2013, 5 pages.

International Preliminary Report on Patentability for Application No. PCT/US2011/051992, dated Mar. 28, 2013, 8 pages.

International Preliminary Report on Patentability for Application No. PCT/US2011/061953, dated Jun. 5, 2014, 7 pages.

International Preliminary Report on Patentability for Application No. PCT/US2012/030383, dated Oct. 10, 2013, 6 pages.

International Preliminary Report on Patentability for Application No. PCT/US2012/030409, dated Oct. 10, 2013, 6 pages.

(56) References Cited

OTHER PUBLICATIONS

International Preliminary Report on Patentability for Application No. PCT/US2012/30360, dated Oct. 10, 2013, 6 pages.
International Preliminary Report on Patentability for Application No. PCT/US2014/024276, dated Sep. 24, 2015, 6 pages.
International Preliminary Report on Patentability for Application No. PCT/US2014/024608, dated Sep. 24, 2015, 8 pages.
International Preliminary Report on Patentability for Application No. PCT/US2014/024722, dated Sep. 24, 2015, 6 pages.
International Preliminary Report on Patentability for Application No. PCT/US2014/024775, dated Sep. 24, 2015, 6 pages.
International Search Report and Written Opinion for Application No. PCT/US2007/084710, dated May 22, 2008, 6 pages.
International Search Report and Written Opinion for Application No. PCT/US2011/051992 dated Mar. 28, 2012, 11 pages.
International Search Report and Written Opinion for Application No. PCT/US2011/061953 dated Jul. 24, 2012, 8 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written opinion for Application No. PCT/US2012/038711, dated Nov. 28, 2012, 7 pages.
International Search Report and Written Opinion for Application No. PCT/US2012/038713, dated Oct. 29, 2012, 7 pages.
International Search Report and Written Opinion for Application No. PCT/US2012/30360, dated Oct. 29, 2012, 7 pages.
International Search Report and Written Opinion for Application No. PCT/US2014/024276, dated Jul. 31, 2014, 7 pages.
International Search Report and Written Opinion for Application No. PCT/US2014/024608, dated Jul. 31, 2014, 9 pages.
International Search Report and Written Opinion for Application No. PCT/US2014/024722, dated Jun. 27, 2014, 7 pages.
International Search Report and Written Opinion for Application No. PCT/US2014/024775, dated Jun. 2, 2014, 7 pages.
International Search Report for Application No. PCT/US2007/066536, dated Jul. 30, 2008, 2 pages.
Kozyrakis et al., "A New Direction for Computer Architecture Research," IEEE, Nov. 1, 1998, vol. 31 (11), pp. 24-32.
Mogul J.C., et al., "Potential Benefits of Delta Encoding and Data Compression for HTTP," Oct. 1, 1997, ACM, SIGCOMM '97, pp. 181-194.
Nagarajan et al., "A Design Space Evaluation of Grid Processor Architectures," 34th ACM/IEEE International Symposium, Piscataway, NJ, Dec. 1-5, 2001, pp. 40-51.
Non-Final Office Action from U.S. Appl. No. 12/296,919, dated Apr. 7, 2011, 8 pages.
Non-Final Office Action from U.S. Appl. No. 12/296,919, dated Jun. 14, 2010, 7 pages.
Advisory Action from U.S. Appl. No. 12/296,919, dated Aug. 26, 2011, 3 pages.
Alimohammad et al., "Modeling of FPGA Local/global Interconnect Resources and Derivation of Minimal Test Configuration," 2002, IEEE, Proceedings of the 17th IEEE International Symposium on Defect and Fault Tolerance in VLSI Systems, DFT'02, pp. 1-9.
Communication pursuant to Article 94(3) EPC for European Application No. 070864410, dated Mar. 16, 2012, 4 pages..
Communication pursuant to Article 94(3) EPC for European Application No. 070864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845, dated Feb. 3, 2014, 5 pages.
Communication pursuant to Article 94(3) EPC for European Application No. 07811845, dated Feb. 16, 2011, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.
Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages.
Communication pursuant to Article 94(3) EPC for European Application No. 12764627, dated Oct. 4, 2016, 4 pages.
Communication pursuant to Rules 161(2) and 162 EPC for Application No. 12763717, dated Nov. 22, 2013, 3 pages.
Communication pursuant to Rules 70(2) and 70a(2) EPC for Application No. 12763717, dated Oct. 10, 2014, 1 page.
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent for Korean Application No. KR1020137027843, dated Apr. 29, 2016, 2 pages.
Decision to Grant a Patent for Korean Patent Application No. 20137027842, dated Mar. 31, 2016, 2 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Examination Report for European Application No. 12763717, dated Nov. 28, 2016, 5 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 12150513, dated Jun. 19, 2012, 8 pages.
Extended European Search Report for Application No. 12174228, dated Oct. 16, 2012, 4 pages.
Extended European Search Report for Application No. 12174229, dated Jul. 4, 2014, 10 pages.
Extended European Search Report for Application No. 12174229, dated Oct. 10, 2012, 7 pages.
Extended European Search Report for Application No. 12788989, dated May 12, 2016, 9 pages.
Extended European Search Report for Application No. 12789667, dated Feb. 26, 2016, 7 pages.
Extended European Search Report for Application No. EP110826042, dated Jan. 24, 2014, 6 pages.
Extended European Search Report for Application No. EP11876128, dated Jun. 21, 2016, 8 pages.
Extended European Search Report for Application No. EP12763717, dated Sep. 24, 2014, 5 pages.
Extended European Search Report for Application No. EP12764627, dated Jul. 10, 2014, 5 pages.
Extended European Search Report for Application No. EP12764838, dated Jul. 10, 2014, 5 pages.
Final Office Action from U.S. Appl. No. 12/296,919, dated Jun. 14, 2011, 7 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/428,438, dated Dec. 24, 2014, 17 pages.
Final Office Action from U.S. Appl. No. 13/428,440, dated Dec. 24, 2014, 19 pages.
Final Office Action from U.S. Appl. No. 13/428,452, dated Dec. 24, 2014, 20 pages.
Final Office Action from U.S. Appl. No. 13/475,708, dated Jun. 9, 2016, 35 pages.
Final Office Action from U.S. Appl. No. 13/475,708, dated May 8, 2015, 23 pages.

(56) References Cited

OTHER PUBLICATIONS

Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
Final Office Action from U.S. Appl. No. 14/212,203, dated Dec. 13, 2016, 20 pages.
Extended European Search Report for Application No. 14769450.9, dated Feb. 21, 2017, 16 pages.
Extended European Search Report for Application No. 16196777.3, dated Mar. 20, 2017, 6 pages.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/214,176, dated Aug. 29, 2016, 17 pages.
Non-Final Office Action from U.S. Appl. No. 14/213,218, dated Apr. 22, 2015, 22 pages.
Non-Final Office Action from U.S. Appl. No. 14/213,218, dated Feb. 2, 2016, 17 pages.
Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Final Office Action from U.S. Appl. No. 15/354,742, dated Nov. 29, 2017, 20 pages.
Final Office Action from U.S. Appl. No. 15/354,857, dated Nov. 28, 2017, 23 pages.
Fourth Office Action and Search report from foreign counterpart China Patent Application No. 201180076248.0, dated Nov. 9, 2017, 38 pages. (Translation available only for office action).
Non-Final Office Action from U.S. Appl. No. 14/360,280, dated Dec. 14, 2017, 25 pages.
Notice of Allowance and Search Report from foreign counterpart Taiwan Patent Application No. 103109479, dated Nov. 30, 2017, 4 pages. (Translation available only for Search report).
Notice of Allowance from foreign counterpart Korean Patent Application No. 10-2017-7002379, dated Dec. 20, 2017, 3 pages.
Notice of Allowance from foreign counterpart Korean Patent Application No. 10-2017-7002473, dated Dec. 20, 2017, 6 pages.
Notice of Allowance from U.S. Appl. No. 13/475,708, dated Nov. 27, 2017, 24 pages.
Notice of Allowance from U.S. Appl. No. 14/216,859, dated Dec. 1, 2017, 113 pages.
Notice of Allowance from U.S. Appl. No. 15/019,920, dated Dec. 6, 2017, 24 pages.
Notice of Allowance from U.S. Appl. No. 15/082,867, dated Dec. 22, 2017, 25 pages.
Notice on Grant of Patent Right for Invention from foreign counterpart Chinese Patent Application No. 201280024054.0, dated Dec. 1, 2017, 4 pages.
Second Office Action from foreign counterpart China Patent Application No. 201480024463.X, dated Nov. 14, 2017, 34 pages.
Extended European Search Report for Application No. 14769411.1, dated Apr. 5, 2017, 8 pages.
Final Office Action from U.S. Appl. No. 14/213,730, dated May 11, 2016, 14 pages.
Final Office Action from U.S. Appl. No. 14/216,859, dated Jun. 9, 2016, 16 pages.
First Office Action from foreign counterpart China Patent Application No. 201280024012.7, dated May 30, 2016, 21 pages.
International Preliminary Report on Patentability for Application No. PCT/US2014/024677, dated Sep. 24, 2015, 7 pages.
International Preliminary Report on Patentability for Application No. PCT/US2014/024828, dated Sep. 24, 2015, 8 pages.
International Search Report and Written Opinion for Application No. PCT/US2014/024677, dated Jun. 30, 2014, 9 pages.

International Search Report and Written Opinion for Application No. PCT/US2014/024828, dated Jul. 28, 2014, 9 pages.
Non-Final Office Action from U.S. Appl. No. 14/212,533, dated Apr. 20, 2017, 116 pages.
Non-Final Office Action from U.S. Appl. No. 14/213,730, dated Jan. 7, 2016, 27 pages.
Non-Final Office Action from U.S. Appl. No. 14/216,859, dated Jan. 28, 2016, 33 pages.
Notice of Allowance from U.S. Appl. No. 13/428,438, dated Apr. 13, 2017, 62 pages.
Notice of Allowance from U.S. Appl. No. 13/428,440, dated Apr. 20, 2017, 46 pages.
Notice of Allowance from U.S. Appl. No. 14/213,730, dated Oct. 27, 2016, 16 pages.
Notice of Allowance from U.S. Appl. No. 14/214,045, dated Apr. 18, 2017, 88 pages.
Notice of Allowance from U.S. Appl. No. 14/216,859, dated Jan. 24, 2017, 17 pages.
Notification of Reason for Refusal from foreign counterpart Korean Patent Application No. KR1020157029107, dated Oct. 13, 2016, 11 pages.
Partial Supplementary European Search Report for Application No. EP14770976.0, dated Mar. 24, 2017, 7 pages.
Advisory Action from U.S. Appl. No. 14/214,280, dated May 15, 2017, 3 pages.
Communication pursuant to Article 94(3) EPC for European Application No. 12788989.7, dated Jun. 22, 2017, 6 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. KR1020157029107, dated Apr. 25, 2017, 2 pages.
Extended European Search Report for Application No. 14770976.0, dated Jul. 3, 2017, 9 pages.
Extended European Search Report for Application No. EP11876130, dated Jun. 1, 2016, 7 pages.
Final Office Action from U.S. Appl. No. 14/213,135, dated Oct. 26, 2015, 20 pages.
Final Office Action from U.S. Appl. No. 14/216,493, dated May 22, 2017, 17 pages.
First Office Action and Search Report from foreign counterpart China Patent Application No. 201480024463.X, dated Apr. 1, 2017, 31 pages. (Translation available only for office action).
First Office Action and Search report from foreign counterpart Chinese Patent Application No. 201180076244.2, dated Mar. 22, 2016, 18 pages (Translation available only for Office Action).
First Office Action from foreign counterpart China Patent Application No. 201180076245.7, dated Mar. 21, 2016, 10 pages.
Intel "Programming on Intel® Platform," The edition team of Intel® Software College course book, Shanghai Jiao Tong University Press, published Jan. 31, 2011, pp. 175-180.
International Preliminary Report on Patentability for Application No. PCT/US2011/061940, dated Jun. 5, 2014, 6 pages.
International Search Report and Written Opinion for Application No. PCT/US2011/061940, dated Jul. 20, 2012, 8 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/360,280, dated Feb. 23, 2017, 34 pages.
Non-Final Office Action from U.S. Appl. No. 14/360,282, dated Jun. 22, 2017, 97 pages.
Non-Final Office Action from U.S. Appl. No. 14/733,827, dated Apr. 28, 2017, 99 pages.
Non-Final Office Action from U.S. Appl. No. 15/219,063, dated May 30, 2017, 102 pages.
Notice of Allowance from U.S. Appl. No. 13/475,708, dated Jun. 16, 2017, 51 pages.
Notice of Allowance from U.S. Appl. No. 13/475,708, dated Jun. 30, 2017, 53 pages.
Notice of Allowance from U.S. Appl. No. 14/213,135, dated Oct. 17, 2016, 17 pages.

(56) References Cited

OTHER PUBLICATIONS

Notice of Allowance from U.S. Appl. No. 14/213,218, dated Jun. 16, 2017, 89 pages.
Notice of Allowance from U.S. Appl. No. 14/214,176, dated May 10, 2017, 88 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 14/360,284, dated Jun. 14, 2017, 100 pages.
Notice of Allowance from U.S. Appl. No. 15/019,920, dated Jul. 14, 2017, 100 pages.
Notice of Allowance from U.S. Appl. No. 15/082,867, dated Jul. 7, 2017, 98 pages.
Notice of Final Rejection from foreign counterpart Korean Patent Application No. 10-2015-7029262, dated May 23, 2017, 7 pages.
Notice of Preliminary Rejection from foreign counterpart Korean Patent Application No. 10-2016-7017150, dated Apr. 20, 2017, 5 pages.
Notification of Reason for Refusal from foreign counterpart Korean Patent Application No. 10-2014-7016774, dated Jan. 28, 2016, 4 pages.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002379, dated May 26, 2017, 6 pages.
Notification of Reason for Refusal from foreign counterpart Korean Patent Application No. 10-2017-7002473, dated May 26, 2017, 7 pages.
Notification to Grant Patent Right for Invention from foreign counterpart China Patent Application No. 201180076245.7, dated Nov. 2, 2016, 3 pages.
Office Action and Search Report from foreign counterpart Taiwan Patent Application No. 101117854, dated Mar. 30, 2017, 7 pages.
Third Office Action and Search report from foreign counterpart China Patent Application No. 201180076248.0, dated May 2, 2017, 27 pages.
Third Office Action from foreign counterpart Chinese Patent Application No. 201180076244.2, dated May 2, 2017, 20 pages.
Final Office Action from U.S. Appl. No. 14/360,280, dated Aug. 10, 2017, 103 pages.
Non-Final Office Action from U.S. Appl. No. 15/082,359, dated Aug. 11, 2017, 108 pages.
Non-final Office Action from U.S. Appl. No. 15/354,742, dated Aug. 25, 2017, 152 pages.
Non-final Office Action from U.S. Appl. No. 15/357,943, dated Aug. 25, 2017, 111 pages.
Notice of Allowance from U.S. Appl. No. 13/428,438, dated Aug. 7, 2017, 42 pages.
Notice of Allowance from U.S. Appl. No. 14/213,135, dated Aug. 3, 2017, 103 pages.
Notice of Allowance from U.S. Appl. No. 14/216,493, dated Aug. 4, 2017, 95 pages.
Final Office Action from U.S. Appl. No. 14/212,203, dated Sep. 12, 2017, 84 pages.
Final Office Action from U.S. Appl. No. 14/212,533, dated Sep. 8, 2017, 69 pages.
Non-Final Office Action from U.S. Appl. No. 15/354,857, dated Sep. 12, 2017, 111 pages.
Notice of Allowance from foreign counterpart Korean Patent Application No. 10-2015-7029262, dated Aug. 31, 2017, 3 pages.
Notice of Allowance from U.S. Appl. No. 14/213,730, dated Aug. 31, 2017, 96 pages.
Notice on Grant of Patent Right for Invention from foreign counterpart China Application No. 201180076244.2, dated Aug. 28, 2017, 4 pages.
Office Action and Search Report from foreign counterpart Taiwan Patent Application No. 100142885, dated Jan. 23, 2017, 12 pages.
Third Office Action from foreign counterpart China Patent Application No. 201280024054.0, dated Jul. 28, 2017, 8 pages.
Yeh, T. et al., Increasing the instruction fetch rate via multiple branch prediction and a branch address cache, IN: the 7th international conference on supercomputing, 1993, 67-76, ACM, New York.
Wallace, S. et al., Multiple branch and block prediction, IN: the 3rd international symposium on high-performance computer architecture, Feb. 1-5, 1997, 94-103, IEEE.
Non-Final Office Action from U.S. Appl. No. 12/296,919, dated Mar. 7, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Non-Final Office Action from U.S. Appl. No. 13/428,438, dated Apr. 24, 2014, 15 pages.
Non-Final Office Action from U.S. Appl. No. 13/428,438, dated May 1, 2015, 12 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Appl. No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 13/475,708, dated Feb. 11, 2015, 27 pages.
Non-Final Office Action from U.S. Appl. No. 13/475,708, dated Feb. 12, 2016, 37 pages.
Non-Final Office Action from U.S. Appl. No. 13/475,739, dated May 21, 2015, 14 pages.
Non-Final Office Action from U.S. Appl. No. 13/475,739, dated Sep. 2, 2014, 15 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 14/194,589, dated Nov. 19, 2015, 12 pages.
Non-Final Office Action from U.S. Appl. No. 14/212,203, dated Mar. 24, 2017, 68 pages.
Non-Final Office Action from U.S. Appl. No. 14/212,203, dated Sep. 8, 2016, 52 pages.
Non-Final Office Action from U.S. Appl. No. 14/212,533, dated Sep. 22, 2016, 52 pages.
Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Non-Final Office Action from U.S. Appl. No. 14/214,280, dated Jan. 6, 2017, 14 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Non-final Office Action from U.S. Appl. No. 14/360,284, dated Oct. 21, 2016, 32 pages.

(56) References Cited

OTHER PUBLICATIONS

Notice of Allowance from foreign counterpart Chinese Patent Application No. 200780046679, dated Feb. 6, 2017, 8 pages.
Notice of Allowance from foreign counterpart Korean Patent Application No. 20137027841, dated Mar. 31, 2016, 2 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/428,438, dated Aug. 10, 2016, 9 pages.
Notice of Allowance from U.S. Appl. No. 13/428,438, dated Dec. 29, 2016, 9 pages.
Notice of Allowance from U.S. Appl. No. 13/428,438, dated Mar. 4, 2016, 14 pages.
Notice of Allowance from U.S. Appl. No. 13/428,438, dated Nov. 6, 2015, 9 pages.
Notice of Allowance from U.S. Appl. No. 13/428,440, dated Feb. 26, 2016, 10 pages.
Notice of Allowance from U.S. Appl. No. 13/428,440, dated Mar. 10, 2017, 52 pages.
Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notice of Allowance from U.S. Appl. No. 13/428,452, dated Oct. 21, 2015, 9 pages.
Notice of Allowance from U.S. Appl. No. 13/475,708, dated Mar. 17, 2017, 55 pages.
Notice of Allowance from U.S. Appl. No. 13/475,708, dated Oct. 13, 2016, 17 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
Notice of Allowance from U.S. Appl. No. 13/691,609, dated Aug. 6, 2014, 11 pages.
Notice of Allowance from U.S. Appl. No. 13/691,609, dated Feb. 23, 2015, 16 pages.
Final Office Action from U.S. Appl. No. 14/360,282, dated Oct. 4, 2017, 22 pages.
Final Office Action from U.S. Appl. No. 15/219,063, dated Nov. 20, 2017, 27 pages.
Notice of Allowance from foreign counterpart Korean Patent Application No. 10-2016-7017150, dated Oct. 30, 2017, 3 pages.
Notice of Allowance from U.S. Appl. No. 14/213,692, dated Sep. 28, 2017, 112 pages.
Notice of Allowance from U.S. Appl. No. 14/214,045, dated Oct. 6, 2017, 137 pages.
Notice of Allowance from U.S. Appl. No. 14/214,176, dated Oct. 19, 2017, 25 pages.
Notice of Allowance from U.S. Appl. No. 14/215,633, dated Oct. 4, 2017, 15 pages.
Notice of Allowance from U.S. Appl. No. 14/733,827, dated Sep. 22, 2017, 30 pages.
Notice of Allowance from U.S. Appl. No. 15/257,593, dated Oct. 11, 2017, 95 pages.
Notice on Grant of Patent Right for Invention from foreign counterpart Chinese Patent Application No. 201280024095. dated Nov. 7, 2017, 6 pages.
Third Office Action from foreign counterpart Chinese Patent Application No. 201280024012.7, dated Nov. 6, 2017, 8 pages.
Notice of Allowance from U.S. Appl. No. 14/194,589, dated Jul. 27, 2016, 7 pages.
Notice of Allowance from U.S. Appl. No. 14/213,115, dated Jun. 27, 2016, 9 pages.
Notice of Allowance from U.S. Appl. No. 14/213,115, dated Oct. 3, 2016, 20 pages.
Notice of Allowance from U.S. Appl. No. 14/213,692, dated Dec. 23, 2016, 19 pages.
Notice of Allowance from U.S. Appl. No. 14/213,854, dated Oct. 7, 2016, 19 pages.
Notification of Reason for Refusal from Foreign Counterpart Korean Patent Application No. 10-2013-7027842, dated Sep. 18, 2015, 7 pages.
Notification of Reason for Refusal from foreign counterpart Korean Patent Application No. 20137027841, dated Sep. 18, 2015, 10 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification of Reason for Refusal from foreign counterpart Korean Patent Application No. KR1020137027843, dated Sep. 30, 2015, 8 pages.
Notification of Reason for Refusal from Korean Application No. 10-2015-7028745 dated May 23, 2016, 8 pages.
Notification to Grant Patent Right for Invention from foreign counterpart China Patent Application No. CN201280034725, dated Aug. 12, 2016, 3 pages.
Notification to Grant Patent Right for Invention from foreign counterpart China Patent Application No. CN201310589048, dated May 5, 2016, 3 pages.
Nuth et al., "The Named-State Register File: Implementation and Performance," High-Performance Computer Architecture, First IEEE Symposium, 1995, 10 pages.
Office Action from foreign counterpart Chinese Patent Application No. 200780046679, dated May 21, 2013, 14 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Office Action from foreign counterpart Taiwan Patent Application No. 20140109479, dated Nov. 28, 2016, 4 pages.
Partial SupplementaryEuropean Search Report for Application No. 14769450.9, dated Oct. 11, 2016, 8 pages.
Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.
Rixner et al., "Register Organization for Media Processing," IEEE, 2000.
Santos et al., "The 2D-VLIW Architecture," Mar. 2006, 13 pages.
Sassone et al., "Dynamic Strands: Collapsing Speculative Dependence Chains for Reducing Pipeline Communication," Microarchitecture, IEEE, 37th International Symposium on Portland, USA Dec. 2004, Piscataway, NJ, USA.
Search Report for Chinese Application No. CN201280024012, dated May 19, 2016, 2 pages.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.
Second Office Action from foreign counterpart Chinese Patent Application No. 201280024054.0, dated Dec. 26, 2016, 11 pages.
Second Office Action with search report from foreign counterpart Chinese Patent Application No. 201180076244, dated Nov. 18, 2016, 21 pages. (Translation available only for Office Action).
Shiliang Hu., et al., "An Approach for Implementing Efficient Superscalar CISC Processors," High Performance Computer Architecture, 2006, Twelfth International Symposium on Austin, Texas Feb. 11-15, 2006, pp. 40-51.
Summons to attend Oral Proceedings for European Application No. 070864410, dated Apr. 3, 2013, 3 pages.
Third Office Action from foreign counterpart Chinese Patent Application No. 201280034739, dated Dec. 27, 2016, 18 pages.
Written Opinion for Application No. PCT/US2007/066536, dated Jul. 30, 2008, 5 pages.
Ashwini K. Nanda; et al. "The Misprediction Recovery Cache"; International Journal of Parallel Programming, vol. 26, No. 4; 1998 Plenum Publishing Corporation; pp. 383-415.

(56) References Cited

OTHER PUBLICATIONS

Jiongyao Ye; et al.; "A New Recovery Mechanism in Superscalar Microprocessors by Recovering Critical Misprediction"; IEICE Trans. Fundamentals, vol. E94-A, No. 12; Dec. 2011; pp. 2639-2648.
Barham P., et al., "Xen and the Art of Virtualization," Proceedings of the ACM Symposium on Operating Systems Principles, XP002298786, Oct. 2003, pp. 164-177.
Communication pursuant to Rules 70(2) and 70a(2) EPC for European Application No. 11876314.3, dated Jul. 1, 2016, 1 page.
Cooperman G.,"Cache Basics," 2003, pp. 1-3, URL: http://www.ccs.neu.edu/course/com3200/parent/NOTES/cache-basics.html.
Extended European Search Report for Application No. 11876314.3, dated Jun. 14, 2016, 6 pages.
Final Office Action from U.S. Appl. No. 14/216,493, dated Aug. 30, 2016, 21 pages.
Final Office Action from U.S. Appl. No. 14/360,282, dated Feb. 16, 2017, 10 pages.
First Office Action and Search report from foreign counterpart China Patent Application No. 201180076248.0, dated Mar. 17, 2016, 25 pages.
Garmany J., "The Power of Indexing," archieved on Mar. 9, 2009, 7 pages.
Grant of Patent for Korean Application No. 10-2014-7016763, dated Oct. 31, 2016, 2 pages.
International Preliminary Report on Patentability for Application No. PCT/US2011/061957, dated Jun. 5, 2014, 7 pages.
International Search Report and Written Opinion for Application No. PCT/US2011/061957, dated Jul. 20, 2012, 8 pages.
Jacobson et al., "Path-based Next Trace Prediction," IEEE, 1997, pp. 14-23.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/360,282, dated Oct. 21, 2016, 13 pages.
Non-final Office Action from U.S. Appl. No. 15/257,593, dated Apr. 7, 2017, 37 pages.
Notice of Allowance from U.S. Appl. No. 14/215,633, dated Mar. 23, 2017, 17 pages.
Notice of Allowance from U.S. Appl. No. 14/215,633, dated May 23, 2016, 9 pages.
Notice of Allowance from U.S. Appl. No. 14/215,633, dated Sep. 29, 2016, 13 pages.
Notification of Reason for Refusal from Korean Application No. 10-2014-7016763, dated Apr. 29, 2016, 11 pages.
Restriction Requirement from U.S. Appl. No. 14/360,282, dated Jul. 28, 2016, 4 pages.
Rotenberg E., et al.,"Trace Cache: a Low Latency Approach to High Bandwidth Instruction Fetching," Apr. 11, 1996, 48 pages.
Second Office Action from foreign counterpart China Patent Application No. 201180076248.0, dated Oct. 20, 2016, 25 pages.
Advisory Action from U.S. Appl. No. 14/212,203, dated Apr. 5, 2018, 8 pages.
Communication pursuant to Article 94(3) EPC for Application No. 14770976.0, dated Mar. 16, 2018, 4 pages.
Communication pursuant to Article 94(3) EPC for Application No. 11876128.7, dated Feb. 5, 2018, 9 pages.
Communication pursuant to Article 94(3) EPC for Application No. 11876130.3, dated Feb. 5, 2018, 9 pages.
Communication pursuant to Article 94(3) EPC for Application No. 11876314.3, dated Feb. 5, 2018, 8 pages.
Communication pursuant to Article 94(3) EPC for Application No. 12789667.8, dated Feb. 21, 2018, 4 pages.
Corrected Notice of Allowance from U.S. Appl. No. 13/475,708, dated Feb. 14, 2018, 27 pages.
Corrected Notice of Allowance from U.S. Appl. No. 13/475,708, dated Feb. 26, 2018, 31 pages.
Corrected Notice of Allowance from U.S. Appl. No. 15/357,943, dated Apr. 2, 2018, 4 pages.
First Office Action and Search Report from foreign counterpart Chinese Patent Application No. 201480024528.0, dated Jan. 26, 2018, 19 pages.
First Office Action and Search Report from foreign counterpart Chinese Patent Application No. 201480024832.5, dated Feb. 6, 2018, 15 pages. (Translation available only for office action).
Intention to grant from foreign counterpart European Patent Application No. 12788989.7, dated Feb. 23, 2018, 47 pages.
Non-Final Office Action from U.S. Appl. No. 15/862,496, dated Apr. 5, 2018, 151 pages.
Notice of Allowance from U.S. Appl. No. 14/216,493, dated Apr. 2, 2018, 22 pages.
Notice of Allowance from U.S. Appl. No. 15/082,359, dated Mar. 21, 2018, 9 pages.
Notice of Allowance from U.S. Appl. No. 15/219,063, dated Mar. 19, 2018, 28 pages.
Notice on Grant of Patent Right for Invention from foreign counterpart Chinese Patent Application No. 201180076248.0, dated Feb. 27, 2018, 6 pages.
Notice on Grant of Patent Right for Invention from foreign counterpart Chinese Patent Application No. 201280024012.7, dated Mar. 12, 2018, 4 pages.
Advisory Action from U.S. Appl. No. 14/360,282, dated Jan. 23, 2018, 2 pages.
Final Office Action from U.S. Appl. No. 15/082,359, dated Jan. 31, 2018, 22 pages.
Notice of Allowance from U.S. Appl. No. 15/357,943, dated Jan. 16, 2018, 16 pages.
First Examination Report from foreign counterpart Indian Patent Application No. 51/KOLNP/2012, dated Jul. 30, 2018, 7 pages.
Notice of Preliminary Rejection from foreign counterpart Korean Patent Application No. 10-2018-7003058, dated Jun. 4, 2018, 10 pages.
Abandonment from U.S. Appl. No. 14/212,203, dated Jul. 26, 2018, 2 pages.
Abandonment from U.S. Appl. No. 14/212,533, dated Jun. 19, 2018, 3 pages.
Abandonment from U.S. Appl. No. 14/360,282, dated May 25, 2018, 2 pages.
Abandonment from U.S. Appl. No. 15/354,857, dated Jul. 30, 2018, 2 pages.
Corrected Notice of Allowance from U.S. Appl. No. 15/219,063, dated Jun. 28, 2018, 8 pages.
Final Office Action from U.S. Appl. No. 14/360,280, dated Jul. 24, 2018, 24 pages.
Non-Final Office Action from U.S. Appl. No. 15/408,323, dated Oct. 9, 2018, 144 pages.
Non-Final Office Action from U.S. Appl. No. 15/853,323, dated Aug. 28, 2018, 115 pages.
Non-Final Office Action from U.S. Appl. No. 15/712,017, dated May 7, 2018, 127 pages.
Non-Final Office Action from U.S. Appl. No. 15/866,323, dated Oct. 1, 2018, 121 pages.
Notice of Allowance from U.S. Appl. No. 14/213,135, dated Oct. 3, 2018, 34 pages.
Notice of Allowance from U.S. Appl. No. 14/360,284, dated Oct. 12, 2018, 45 pages.
Notice of Allowance from U.S. Appl. No. 15/408,311, dated Aug. 28, 2018, 138 pages.
Notice of Allowance from U.S. Appl. No. 15/712,017, dated Oct. 3, 2018, 16 pages.
Notice of Allowance from U.S. Appl. No. 14/216,493, dated Aug. 1, 2018, 14 pages.
Notice of Allowance from U.S. Appl. No. 15/408,255, dated Jul. 25, 2018, 136 pages.
Notice of Allowance from U.S. Appl. No. 15/408,269, dated Sep. 24, 2018, 137 pages.

* cited by examiner

300

```
┌─────────────────────────────────────┐
│ Access a plurality instructions of  │
│ a sequence including multiple       │
│ branch instructions                 │
│ 301                                 │
└─────────────────────────────────────┘
                  ↓
┌─────────────────────────────────────┐
│ Generate a first mask for each      │
│ branch included in the sequence     │
│ of instructions                     │
│ 302                                 │
└─────────────────────────────────────┘
                  ↓
┌─────────────────────────────────────┐
│ Generate a second mask for each     │
│ branch included in the sequence     │
│ of instructions                     │
│ 303                                 │
└─────────────────────────────────────┘
                  ↓
┌─────────────────────────────────────┐
│ Receive a branch prediction output  │
│ for each of the branches included   │
│ and sequence of instructions        │
│ 304                                 │
└─────────────────────────────────────┘
                  ↓
┌─────────────────────────────────────┐
│ Use the branch prediction output    │
│ to select between the first mask    │
│ and the second mask with each of    │
│ the branch instructions             │
│ 305                                 │
└─────────────────────────────────────┘
                  ↓
┌─────────────────────────────────────┐
│ Invalidate subsequent branches of   │
│ the instruction sequence if the     │
│ branch prediction indicates a       │
│ prior branch will skip the          │
│ subsequent branch                   │
│ 306                                 │
└─────────────────────────────────────┘
                  ↓
┌─────────────────────────────────────┐
│ Perform a logical operation on all  │
│ the resultant masks to produce a    │
│ final mask                          │
│ 307                                 │
└─────────────────────────────────────┘
                  ↓
┌─────────────────────────────────────┐
│ Use the final mask to create a      │
│ compact execution path instruction  │
│ sequence                            │
│ 308                                 │
└─────────────────────────────────────┘
```

FIGURE 3

SINGLE CYCLE MULTI-BRANCH PREDICTION INCLUDING SHADOW CACHE FOR EARLY FAR BRANCH PREDICTION

CROSS-REFERENCE TO RELATED APPLICATIONS

This application is a national stage of International Application No. PCT/US2011/051992, filed Sep. 16, 2011, which claims the benefit of U.S. Provisional Application No. 61/384,198, filed Sep. 17, 2010, which are hereby incorporated by reference.

FIELD OF THE INVENTION

The present invention is generally related to digital computer systems, more particularly, to a system and method for selecting instructions comprising an instruction sequence.

BACKGROUND OF THE INVENTION

Improving computer architecture performance is a difficult task. Improvements have been sought through frequency scaling, Single Instruction Multiple Data (SIMD), Very Long Instruction Word (VLIW), multi-threading and multiple processor techniques. These approaches mainly target improvements in the throughput of program execution. Many of the techniques require software to explicitly unveil parallelism. In contrast, frequency scaling improves both throughput and latency without requiring software explicit annotation of parallelism. Recently, frequency scaling hit a power wall so improvements through frequency scaling are difficult. Thus, it is difficult to increase throughput unless massive explicit software parallelization is expressed.

With respect to single threaded program execution, program execution is controlled by branching instructions that dictate the program control flow. Program instruction sequences are dynamic when the branching instructions are conditional or the branch target is indirect. In such cases, it is essential for the fetch logic of the processor to find out for conditional branches if the branch is taken or not taken. This enables the fetch logic to bring in the sequence of instructions that either follow the target of the branch or those that follows the branch instruction itself. There exists a problem, however, in that at the fetch stage, the outcome of the condition of the branch is not known before the branch itself executes.

In an attempt to overcome this problem, prior art designs have implemented branch prediction logic to predict the outcome of a branch. At the fetch stage of the microprocessor, the predicted outcome enables the fetch logic to anticipate where to bring the next sequence of instructions from. Problems still exists, however, since the logic of the fetch stage quickly gets very complicated if more than one conditional branch is to be processed in the same cycle. The reason is that this processing needs to be sequential in nature. The current branch needs to be processed first in order to know where to bring the next instruction sequence. This aspect could cause the next branch in sequence to be skipped. Accordingly the sequential nature of processing branches in the fetch stage imposes a performance bottleneck on the single threaded execution speed of a microprocessor.

SUMMARY OF THE INVENTION

Embodiments of the present invention implement an algorithm (e.g., a method and an apparatus) that enables a parallelization of a microprocessor's fetch logic to process multiple branches in every single cycle. The algorithm also forms the final sequence of instructions based on the branches predictions also within the single cycle.

In one embodiment, the present invention is implemented as a method of identifying instructions of a predicted execution path. The method includes accessing a plurality of instructions that comprise multiple branch instructions. For each branch instruction of the multiple branch instructions, a respective first mask is generated representing instructions that are executed if said branch is taken. A respective second mask is generated representing instructions that are executed if said branch is not taken. A prediction output is received that comprises a respective branch prediction for each branch instruction of said multiple branch instructions. For each branch instruction of said multiple branch instructions, said prediction output is used to select a respective resultant mask from among said respective first and second masks. For each branch instruction, a resultant mask of a subsequent branch is invalidated if a previous branch is predicted to branch over said subsequent branch. A logical operation is performed on all resultant masks to produce a final mask. A subset of instructions are selected for execution, from said plurality of instructions, based on said final mask.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 3 shows an overview flowchart of the steps of a process for identifying and extracting the instructions comprising an execution path of an instruction sequence having multiple branches in accordance with one embodiment of the present invention.

DETAILED DESCRIPTION OF THE INVENTION

Figure 1:
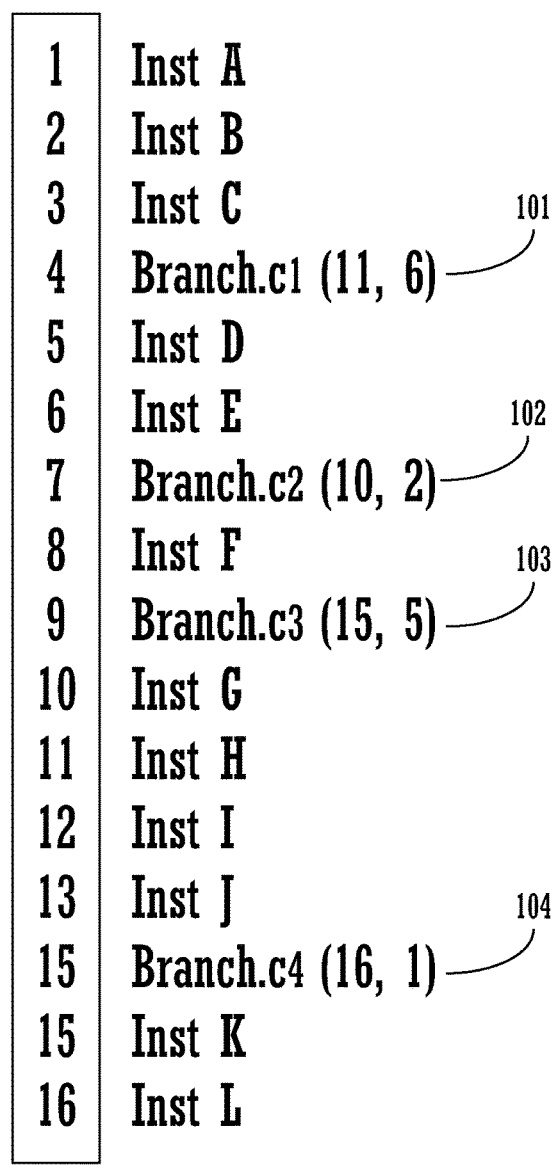
FIG. 1 shows an exemplary sequence of instructions operated on by one embodiment of the present invention.

Although the present invention has been described in connection with one embodiment, the invention is not intended to be limited to the specific forms set forth herein.

On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 2:
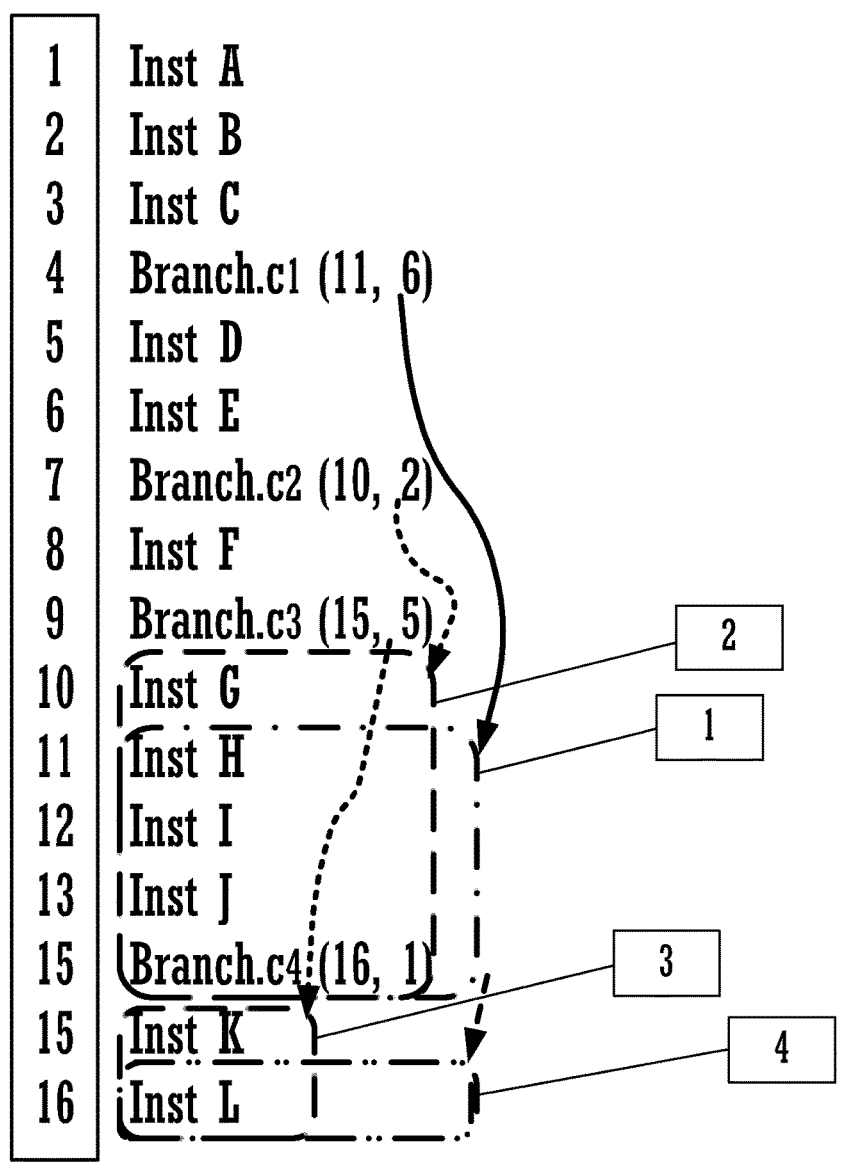
FIG. 2 shows the sequence instructions with the respective code segments for each branch illustrated in accordance with one embodiment of the present invention.

Embodiments of the present invention implement an algorithm (e.g., a method and an apparatus) that enables a parallelization of a microprocessor's fetch logic to process multiple branches in every single cycle. The algorithm also forms the final sequence of instructions based on the branches predictions also within the single cycle. This task is performed without needing to process the branches in a sequential manner (e.g., without processing the sequence of instructions branch by branch at a rate of one branch per cycle). Instead, embodiments of the present invention enables a processing rate of multiple branches per cycle, thereby enabling a large instruction fetch and allocate bandwidth. It should be noted that the processing of an individual branch instruction may not finish within a single cycle, however, the processor hardware can process multiple branches every cycle, thereby achieving throughput of multiple branches per cycle. In this manner, the branch processing rate is every cycle but the latency is not necessary within a single cycle. FIG. 1 and FIG. 2 show an exemplary sequence of instructions operated on by embodiments of the present invention. Subsequently, FIG. 3 shows an overview flowchart of the steps of a process for identifying and extracting the instructions comprising an execution path in an instruction sequence having multiple branches in accordance with one embodiment of the present invention.

FIG. 1 shows an exemplary sequence of instructions operated on by one embodiment of the present invention. As depicted in FIG. 1, the instruction sequence 100 comprises 16 instructions, proceeding from the top of FIG. 1 to the bottom. As can be seen in FIG. 1, the sequence 100 includes four branch instructions 101-104.

One objective of embodiments of the present invention is to process entire groups of instructions in every single cycle. In accordance with different embodiments, these instructions can comprise native instructions (e.g., native instructions of the microprocessor architecture, such as x86 instructions, MIPS instructions, or the like). Alternatively, these instructions can comprise microcode.

In one embodiment, the entire group of 16 instructions is processed in the same single cycle. As described earlier, the more branches a sequence of instructions include, the more combinations and possible resulting sequences occur and need to be dealt with. This characteristic is illustrated in FIG. 2 below.

FIG. 2 shows the sequence instructions 100 with the respective code segments for each branch illustrated in accordance with one embodiment of the present invention. As described above, the more branches that are presented in a sequence of instructions, the more combinations and possibilities of sequences of instructions that need to be disambiguated. Additionally, more branches brings the possibility that more branches may be skipped.

This is illustrated in FIG. 2, which shows a first resulting sequence "1" that occurs if branch c1 is taken. As referred to herein, a branch is taken if the program execution flow moves to the target of the branch. This is indicated by the two digits within parenthesis at the end of each of the branch instructions. For example, branch c1 has a target of 11 and results in skipping the next 6 instructions. Similarly, branch c2 has a target of 10 and results in skipping the next 2 instructions, and so on.

Thus, a second resulting sequence "2" is shown, and occurs if branch c2 is taken. A third resulting sequence "3" is shown as occurring if branch c3 is taken. Similarly, the fourth resulting sequence "4" is shown as occurring if branch c4 is taken.

As shown in FIG. 2, the resulting sequences from the branches overlap one another. This illustrates the manner in which a preceding branch in the sequence of instructions can invalidate a subsequent branch by jumping over that subsequent branch. Thus, if branch c1 is taken, the two subscribe branches c2 and c3 are skipped and thereby invalidated, or rendered irrelevant to the execution path of the sequence of instructions. Similarly, if branch c1 is not taken and branch c2 is taken, the subsequent branch c3 will be skipped and thereby invalidated.

Embodiments of the present invention implement an algorithm (e.g., a method and an apparatus) that enables a parallelization of a microprocessor's fetch logic to process multiple branches, such as branches c1 through c4, in every single cycle. The algorithm also forms the final sequence of instructions based on the branch predictions for c1 through c4 also within the single cycle. This algorithm is described below in FIG. 3.

FIG. 3 shows an overview flowchart of the steps of a process 300 for identifying and extracting the instructions comprising an execution path of an instruction sequence having multiple branches in accordance with one embodiment of the present invention. Process 300 show exemplary operating steps of, for example, an instruction fetch module of a microprocessor.

Process 300 begins in step 301, where a fetch module accesses a plurality of instructions that comprise multiple branch instructions. As described above, an instruction sequence is accessed, wherein that instruction sequence includes a number of branch instructions (e.g., branches c1-c4 of sequence 100 of FIG. 1).

In step 302, for each branch instruction of the multiple branch instructions, a respective first mask is generated. This first mask represents instructions that are executed if that particular branch is taken.

In step 303, for each of the branch instructions, a respective second mask is generated. This second mask represents instructions that are executed if that particular branch is not taken. Thus, at the conclusion of step 303, each of the branches within the instruction sequence will have two masks, one that represents instructions that are executed if the branch is taken, and another that represents instructions that are executed if the branch is not taken.

In step 304, a branch prediction output is received by the fetch module. The branch prediction output gives a predicted taken or not taken status for each of the branches of the instruction sequence.

In step 305, the branch prediction output is used to select between the first mask and the second mask for each of the branch instructions of the instruction sequence. For example, for a given branch, if the branch prediction output indicates that branch will be taken, the first mask for the branch will be selected. If the branch prediction output indicates that branch will not be taken, the second mask for the branch will be selected. The masks selected by the branch prediction output are referred to as a resultant masks.

In step 306, for each branch instruction of the instruction sequence, a resultant mask of a subsequent branch is invalidated if a previous branch is predicted to branch, or skip, over that subsequent branch. As described above, a preceding branch in the sequence of instructions can invalidate a subsequent branch by skipping over that subsequent branch.

In step 307, a logical operation is performed on all resultant masks to produce a final mask. Accordingly, this final mask identifies the instructions comprising the execution path in the instruction sequence as determined by the predicted outcomes of the multiple branches within the sequence.

In step 308, the final mask is used to select a subset of instructions for execution, out of the plurality of instructions comprising the instruction sequence. In so doing, a compact execution path instruction sequence is produced by the fetch module. In one embodiment, this compact execution instruction sequence is produced in every single cycle.

Figure 4:
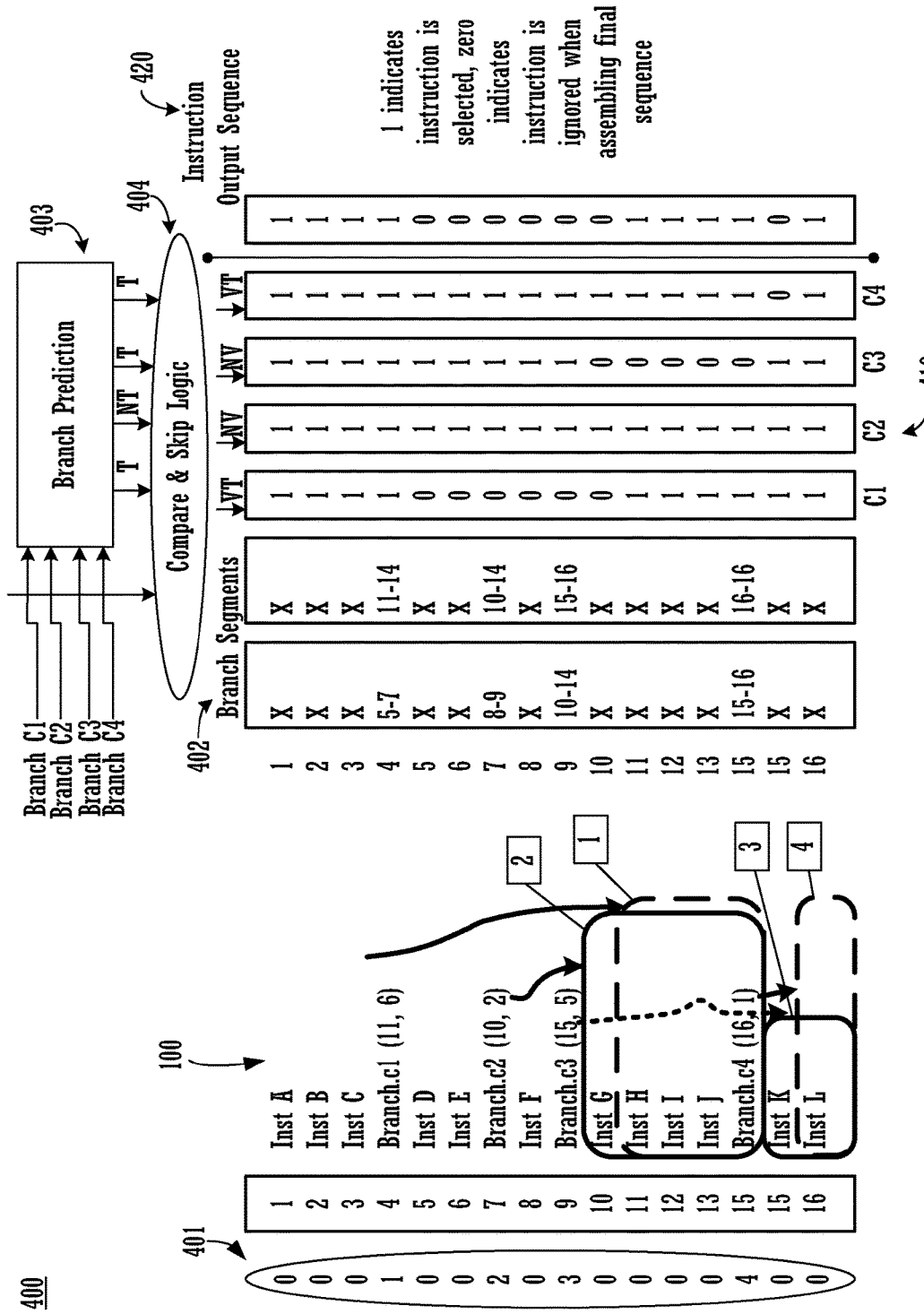
FIG. 4 shows a flow diagram that illustrates the operation of a process for identifying and extracting the instructions comprising an execution path of an instruction sequence having multiple branches in accordance with one embodiment of the present invention.

FIG. 4 shows a flow diagram 400 that illustrates the operation of a process for identifying and extracting the instructions comprising an execution path of an instruction sequence having multiple branches in accordance with one embodiment of the present invention.

As described above, an objective of embodiments of the present invention is to process entire groups of instructions in one cycle. This is illustrated in FIG. 4, where all 16 instructions of the instruction sequence 100 are processed by the fetch module in one cycle. The identifier 401 illustrates the manner in which the fetch module identifies each of the branches therein. Starting from the top of the instruction sequence 100, the first branch identified is labeled, the second branch identified is labeled, and so on, to reduce the sequence to only the conditional operations (e.g., the branches). Ordinary instructions (e.g., instructions other than branch instructions) are simply tagged with a zero.

FIG. 4 also illustrates the branch segment table 402 that tracks the segments of the branches. On the left-hand side of the branch segment table, each corresponding branch has a segment that begins at that branches number in the sequence and ends at the number of the subsequent branch. Thus, as shown in FIG. 4, branch c1 has a first segment 5-7, which are the instructions that will be executed if the branch is not taken. Similarly, on the right hand side, branch c1 has a second segment 11-14 which are of instructions that will be executed if the branch is taken. Ordinary instructions are tagged with an x.

As described above, for each branch instruction of the multiple branch instructions, a respective first mask is generated. This first mask represents instructions that are executed if that particular branch is taken. Similarly, for each of the branch instructions, a respective second mask is generated. This second mask represents instructions that are executed if that particular branch is not taken. Thus, at the conclusion of step 303, each of the branches within the instruction sequence will have two masks, one that represents instructions that are executed if the branch is taken, and another that represents instructions that are executed if the branch is not taken. In one embodiment, these masks comprise sets of bits.

A branch prediction component 403 examines the branches within the instruction segment and predicts whether each of the branches will be taken "T" or not taken "NT". In the present embodiment, the output of the branch prediction component 403 is processed by a compare and skip logic component 404 of the fetch module. Through the operation of the compare and skip module 404, the branch prediction output is used to select between the first mask or the second mask for each of the branch instructions of the instruction sequence.

FIG. 4 shows the resultant masks 410. As described above, for a given branch, if the branch prediction output indicates that branch will be taken, the first mask for the branch will be selected. If the branch prediction output indicates that branch will not be taken, the second mask for the branch will be selected. The masks selected by the branch prediction output are shown as the resultant masks 410.

Resultant masks can be invalidated by preceding branches. This is shown in FIG. 4 where the top of the resultant masks 410 shows their respective status as valid and taken "VT" or invalid "NV". As described above, for each branch instruction of the instruction sequence, a resultant mask of a subsequent branch is invalidated if a previous branch is predicted to branch, or skip, over that subsequent branch. Similarly, a preceding branch in the sequence of instructions can invalidate a subsequent branch by skipping over that subsequent branch. Thus, even though a resultant mask may be predicted taken "T" by the branch prediction output, that resultant mask may then be invalidated by a preceding branch. This is shown in FIG. 4 where even though the branch c3 is predicted taken, the compare and skip logic 404 invalidates c3's resultant mask. In the FIG. 4 embodiment, mask invalidation results in all sequence positions of the mask (e.g., 1 to 16) being filled with one's.

FIG. 4 also shows the output instruction sequence of the final mask 420. As described above, the fetch module performs a logical operation (e.g., a logical AND operation) on all resultant masks to produce a final mask. Accordingly, this final mask identifies the instructions comprising the execution path in the instruction sequence as determined by the predicted outcomes of the multiple branches within the sequence. In one embodiment, the logical operation performed only on the valid resultant masks. In another embodiment, the logical operation is performed on all the masks, wherein the invalid masks are filled with all ones. The final mask 420 is used to select a subset of instructions for execution, out of the plurality of instructions comprising the instruction sequence. In so doing, a compact execution path instruction sequence is produced by the fetch module. In one embodiment, this compact execution instruction sequence is produced in every single cycle.

It should be noted that the algorithm of embodiments of the present invention forms the final sequence of instructions based on the branches predictions also within the single cycle. This task is performed without needing to process the branches in a sequential manner (e.g., without processing the sequence of instructions branch by branch at a rate of one branch per cycle).

In one embodiment, the algorithm is facilitated by associating each branch with a bit that identifies the branch location in the sequence of instructions. Using those bits, each of the branches is associated with 2 segments (e.g., the branch segment table 402). As described above, the first segment is the sequence of instructions that follow the branch up to the next branch. The second segment is the sequence of instructions that start from the target of the branch till the next branch. The branch identifying bits alongside the target of the branch (e.g., as indicated by the offset from current branch location) are used to create those segments. At the same time all branches are looked up in parallel in the branch prediction table to find out their predictions; those branch predictions are similar to typical single branch prediction.

It should also be noted that in one embodiment, each branch location is compared with the previous branch targets in parallel to identify whether this branch is inside or outside the scopes of the previous branches. It is then determined whether the branch is skipped by a target of a previous valid branch that jumps beyond the branch location. This information is qualified by the parallel look up of the prediction of the branches to find out which branches are skipped and thus their sequence formation is not included in the final sequence of instructions. The final instruction sequence is formed out of assembling the relevant segments of instructions by selecting the predicted segment of each branch that is valid (e.g., was not skipped because of a previous valid branch skipping it) using the branch prediction to generate the resultant masks of those branches as shown in FIG. 4.

Figure 5:
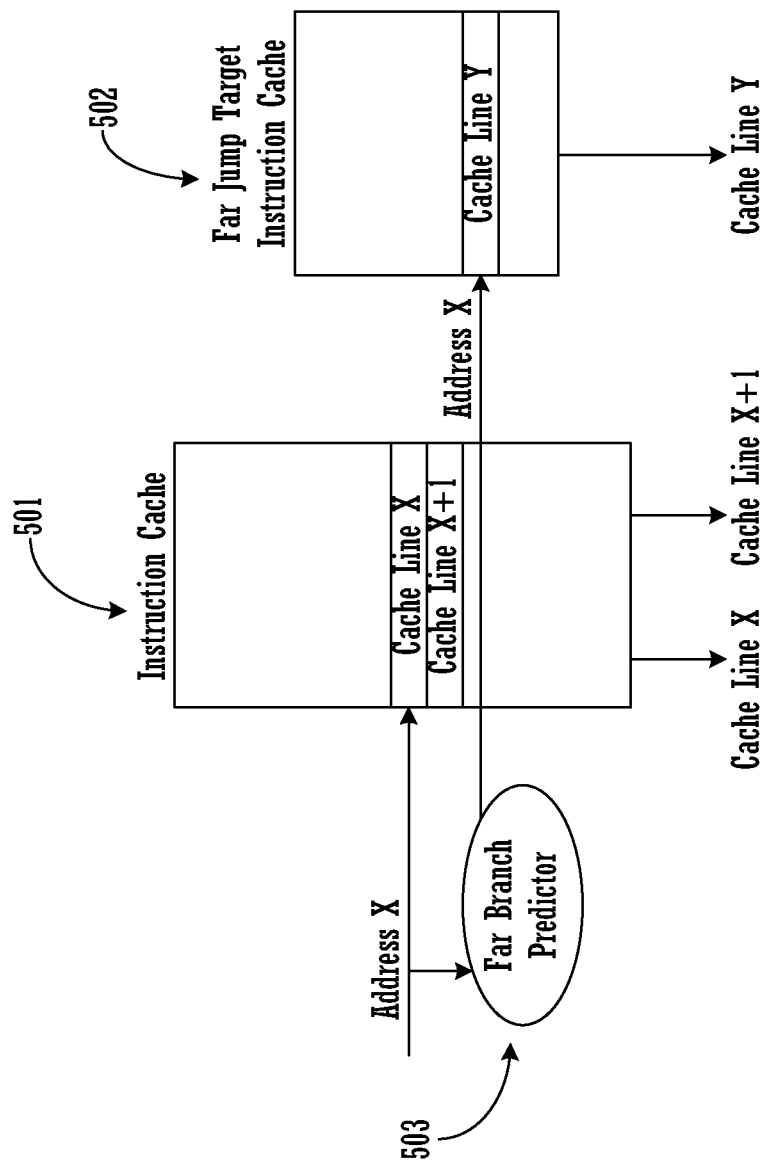
FIG. 5 shows a far branch cache and a far jump target instruction cache in accordance with one embodiment of the present invention.

FIG. 5 shows a far branch cache 501 and a far jump target instruction cache 502 in accordance with one embodiment of the present invention. FIG. 5 also shows a far branch predictor 503.

The FIG. 5 embodiment shows an optimization of the overall microprocessor pipeline where 2 cache lines or more are presented to the fetch module (e.g., the instruction sequence disambiguation logic). In the FIG. 5 embodiment, the instructions are first collected from multiple cache lines. The fetch starts with pointing to a start cache line of an instruction sequence, shown in FIG. 5 as cache line X. That start cache line and the next subsequent cache line, cache line X+1 (or more), are fetched from a cache structure 501. The far jump target instruction cache structure 502 is used to substitute the next cache line (e.g., cache line X+1) by a far target cache line (e.g., cache line Y) if the instruction sequence happens to have a far jump outside the next cache line. The far target cache line instruction sequences are selected if the prediction from the far branch predictor 503 indicates the far target cache line will be taken. Otherwise the far target cache line Y is ignored by the fetch module.

In another embodiment, instead of storing whole cache lines in the caching structures, portions of cache lines can be concatenated together and stored in the caching structures. In one embodiment, the portions of cache lines are concatenated together at branch boundaries to form a whole new cache lines that can be used to improve the density of the sequence of valid instructions. To enable this functionality, branch prediction information is stored with the cache lines to state how the portions of the cache lines were concatenated such that those predictions can be verified when actual branch outcomes are known. Also far branches can be modified or added to jump to new targets considering the newly concatenated cache lines portions, thereby improving the front end throughput of incoming instructions.

In one embodiment, this can be done on 2 stages. The first stage fetches multiple cache lines from the cache structures. The chosen cache lines are then presented to an instruction sequence assembler which disambiguates the branches based on dynamic branch prediction and assembles the final instruction sequence. An instruction sequence buffer structure is disposed at the output of the instruction sequence disambiguation logic. The instruction sequence buffer functions as a buffer to the next stage of the pipeline and also selectively stores certain instruction sequences for future usage. The instruction sequence buffer can store the final assembled segments of either frequently predicted sequences (when branch leading to the sequence is highly predictable) or frequently miss-predicted sequences (when branch leading to the sequence is highly miss-predictable).

This instruction sequence buffer will improve the bandwidth and reduce the latency to the instruction fetch module of the front end because those sequences stored in the buffer do not need to undergo the instruction sequencing process described earlier using branch prediction tables and masks.

Figure 6:
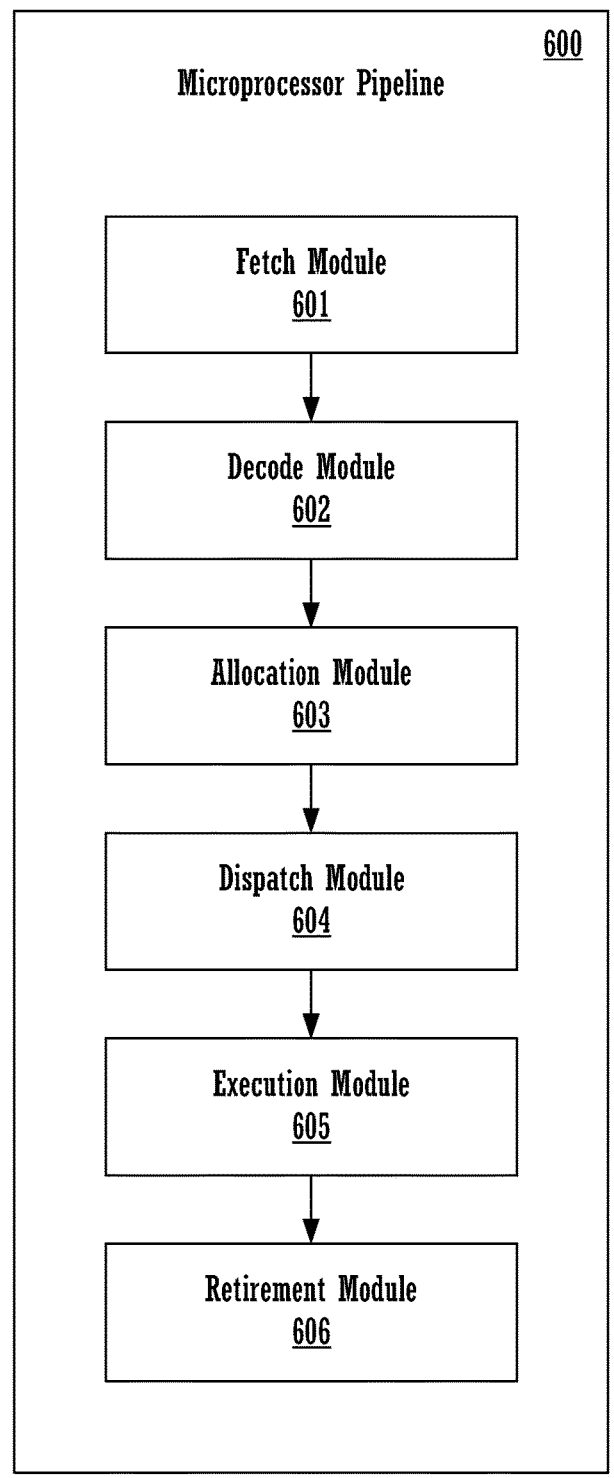
FIG. 6 shows a diagram of an exemplary microprocessor pipeline in accordance with one embodiment of the present invention.

FIG. 6 shows a diagram of an exemplary microprocessor pipeline 600 in accordance with one embodiment of the present invention. The microprocessor pipeline 600 includes a fetch module 601 that implements the functionality of the process for identifying and extracting the instructions comprising an execution, as described above. In the FIG. 6 embodiment, the fetch module is followed by a decode module 602, an allocation module 603, a dispatch module 604, an execution module 605 and a retirement modules 606. It should be noted that the microprocessor pipeline 600 is just one example of the pipeline that implements the functionality of embodiments of the present invention described above. One skilled in the art would recognize that other microprocessor pipelines can be implemented that include the functionality of the decode module described above.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A system for identifying instructions, said system comprising:
    a fetch module to:
    access a plurality of instructions that comprise multiple branch instructions,
    for each branch instruction of said multiple branch instructions, generate a respective first mask representing instructions that are executed if said branch is taken and a respective second mask representing instructions that are executed if said branch is not taken,
    receive a prediction output that comprises a respective branch prediction for each branch instruction of said multiple branch instructions,
    for each branch instruction of said multiple branch instructions, use said prediction output to select a respective resultant mask from among said respective first and second masks,
    for each branch instruction, invalidate a resultant mask of a subsequent branch if a previous branch is predicted to branch over said subsequent branch,
    perform a logical operation on all resultant masks to produce a final mask, and
    select a subset of instructions for execution, from said plurality of instructions, based on said final mask.

2. The system of claim 1, wherein said subset of instructions is selected within one clock cycle of accessing said plurality of instructions.

3. The system of claim 1, further comprising: one or more execution units to execute said subset of instruction.

4. The system of claim 1, wherein said prediction output is received from a branch prediction unit.

5. The system of claim 1, wherein branch instructions of said subset of instructions are identified and labeled.

6. The system of claim 1, wherein said logical operation is an AND operation.

7. The system of claim 6, wherein all invalidated resultant masks contain all set bits.

8. A microprocessor or identifying instructions, said microprocessor comprising:
    a microprocessor pipeline that includes fetch module, wherein the fetch module is to:
    access a plurality of instructions that comprise multiple branch instructions,
        for each branch instruction of said multiple branch instructions, generate a respective first mask representing instructions that are executed if said branch is taken and a respective second mask representing instructions that are executed if said branch is not taken,
        receive a prediction output that comprises a respective branch prediction for each branch instruction of said multiple branch instructions,
        for each branch instruction of said multiple branch instructions, use said prediction output to select a respective resultant mask from among said respective first and second masks,
        for each branch instruction, invalidate a resultant mask of a subsequent branch if a previous branch is predicted to branch over said subsequent branch,
        perform a logical operation on all resultant masks to produce a final mask, and
        select a subset of instructions for execution, from said plurality of instructions, based on said final mask.

9. The microprocessor of claim 8, wherein said subset of instructions is selected within one clock cycle of accessing said plurality of instructions.

10. The microprocessor of claim 8, further comprising: one or more execution units to execute said subset of instructions selected by said fetch module.

11. The microprocessor of claim 8, wherein said prediction output is received from a branch prediction unit.

12. The microprocessor of claim 8, wherein branch instructions of said subset of instructions are identified and labeled.

13. The microprocessor of claim 8, wherein said logical operation is an AND operation.

14. The microprocessor of claim 8, wherein all invalidated resultant masks contain all set bits.

15. A system comprising:
    a fetch module to:
    collect instructions from a plurality of cache lines, wherein one of the plurality of cache lines comprises a start cache line of an instruction sequence, one of the plurality of cache lines comprises a subsequent cache line following the start cache line and one of the plurality of cache lines comprises a far target cache line,
    upon receiving a prediction that execution flow of an execution sequence will proceed from the start cache line to the subsequent cache line, ignore the far target cache line for execution flow to encompass the subsequent cache line, and
    upon receiving a prediction that execution flow of the execution sequence will proceed from the start cache line to the far target cache line, ignore the subsequent cache line for execution flow to encompass the far target cache line.

16. The system of claim 15, further comprising:
    a first instruction cache to store the start cache line and the subsequent cache line, wherein the fetch module accesses the start cache line and the subsequent cache line from the first instruction cache; and
    a second instruction cache to store the far target cache line, wherein the fetch module accesses the far target cache line from the second instruction cache.

17. The system of claim 15, further comprising:
    an instruction sequence assembler to disambiguate branches of the instruction sequence using dynamic branch prediction.

18. The system of claim 17, further comprising:
    a far branch predictor to generate a branch prediction to control whether execution flow will proceed to the subsequent cache line or the far target cache line.

19. The system of claim 15, wherein portions of cache lines are concatenated together and stored in caching structures, and wherein the portions of cache lines are concatenated together at branch boundaries to form a whole new cache lines.

20. A microprocessor comprising:
    a microprocessor pipeline that includes a fetch module, wherein the fetch module is to:

collect instructions from a plurality of cache lines, wherein one of the plurality of cache lines comprises a start cache line of an instruction sequence, one of the plurality of cache lines comprises a subsequent cache line following the start cache line and one of the plurality of cache lines comprises a far target cache line, upon receiving a prediction that execution flow of an execution sequence will proceed from the start cache line to the subsequent cache line, ignore the far target cache line for execution flow to encompass the subsequent cache line, and upon receiving a prediction that execution flow of the execution sequence will proceed from the start cache line to the far target cache line, ignore the subsequent cache line for execution flow to encompass the far target cache line.

21. The microprocessor of claim 20, further comprising:
a first instruction cache to store the start cache line and the subsequent cache line, wherein the fetch module accesses the start cache line and the subsequent cache line from the first instruction cache; and
a second instruction cache to store the far target cache line, wherein the fetch module accesses the far target cache line from the second instruction cache.

22. The microprocessor of claim 20, further comprising:
an instruction sequence assembler to disambiguate branches of the instruction sequence using dynamic branch prediction.

23. The microprocessor of claim 22, further comprising:
a far branch predictor to generate a branch prediction to control whether execution flow will proceed to the subsequent cache line or the far target cache line.

24. The microprocessor of claim 20, wherein portions of cache lines are concatenated together and stored in caching structures, and wherein the portions of cache lines are concatenated together at branch boundaries to form a whole new cache lines.

* * * * *